US011209063B2

(12) United States Patent
Kawata et al.

(10) Patent No.: US 11,209,063 B2
(45) Date of Patent: Dec. 28, 2021

(54) FRICTION MATERIAL COMPOSITION AND FRICTION MATERIAL

(71) Applicant: AKEBONO BRAKE INDUSTRY CO., LTD., Tokyo (JP)

(72) Inventors: Toru Kawata, Tokyo (JP); Takuya Takada, Tokyo (JP); Motoyuki Miyaji, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 105 days.

(21) Appl. No.: 16/346,628

(22) PCT Filed: Jan. 11, 2017

(86) PCT No.: PCT/JP2017/039637
§ 371 (c)(1),
(2) Date: May 1, 2019

(87) PCT Pub. No.: WO2018/084218
PCT Pub. Date: May 11, 2018

(65) Prior Publication Data
US 2020/0063814 A1 Feb. 27, 2020

(30) Foreign Application Priority Data
Nov. 2, 2016 (JP) .............................. JP2016-215331

(51) Int. Cl.
*F16D 69/02* (2006.01)
*F16D 13/60* (2006.01)

(52) U.S. Cl.
CPC ............ *F16D 69/026* (2013.01); *F16D 13/60* (2013.01); *F16D 2200/0069* (2013.01); *F16D 2200/0086* (2013.01)

(58) Field of Classification Search
CPC ................... F16D 69/026; F16D 13/60; F16D 2200/0069; F16D 2200/0086; F16D 13/62; F16C 33/12
See application file for complete search history.

(56) References Cited

U.S. PATENT DOCUMENTS

| | | | | |
|---|---|---|---|---|
| 4,130,537 A * | 12/1978 | Bohrer | ................. | F16D 69/026 523/156 |
| 4,262,788 A | 4/1981 | Yamamoto et al. | | |
| 4,364,997 A | 12/1982 | Yamamoto et al. | | |
| 4,385,682 A | 5/1983 | Yamamoto et al. | | |
| 4,497,915 A * | 2/1985 | Horoldt | ................... | C08L 79/04 523/156 |
| 4,585,691 A | 4/1986 | Nishimura et al. | | |
| 4,950,530 A | 8/1990 | Shibatani | | |
| 5,004,089 A * | 4/1991 | Hara | .................... | B29C 43/021 192/107 M |
| 5,573,579 A * | 11/1996 | Nakanishi | ............. | F16D 69/026 106/36 |
| 2005/0186870 A1 | 8/2005 | Maruo et al. | | |
| 2008/0254697 A1 | 10/2008 | Maruo et al. | | |
| 2013/0032445 A1* | 2/2013 | Suzuki | ................... | D21H 17/67 192/107 M |
| 2013/0037373 A1 | 2/2013 | Dong et al. | | |
| 2013/0220748 A1 | 8/2013 | Unno et al. | | |
| 2015/0031787 A1 | 1/2015 | Bares et al. | | |
| 2015/0323028 A1* | 11/2015 | Canuti | .................. | F16D 69/028 188/251 A |
| 2019/0024744 A1* | 1/2019 | Baba | ..................... | F16D 69/028 |

FOREIGN PATENT DOCUMENTS

| | | |
|---|---|---|
| CN | 101381898 A | 3/2009 |
| CN | A-102994040 | 3/2013 |
| CN | A-102994043 | 3/2013 |
| CN | A-103168084 | 6/2013 |
| DE | A1-2925265 | 1/1981 |
| DE | A1-19756209 | 7/1999 |
| DE | 20 2006 000 062 U1 | 5/2007 |
| EP | A2-0063453 | 10/1982 |
| EP | A2-0451320 | 10/1991 |
| GB | A-2137640 | 10/1984 |
| JP | A-S54-063153 | 5/1979 |
| JP | A-S54-107486 | 8/1979 |
| JP | A-S56-063123 | 5/1981 |
| JP | A-S56-069244 | 6/1981 |
| JP | A-S56-167920 | 12/1981 |
| JP | A-S57-184738 | 11/1982 |
| JP | A-S58-072723 | 4/1983 |
| JP | A-S58-087383 | 5/1983 |
| JP | A-S58-180573 | 10/1983 |
| JP | A-S58-204080 | 11/1983 |
| JP | A-S59-159432 | 9/1984 |
| JP | A-S59-187074 | 10/1984 |
| JP | A-S61-052432 | 3/1986 |
| JP | A-S61-160632 | 7/1986 |
| JP | A-S62-002029 | 1/1987 |
| JP | A-S63-140132 | 6/1988 |
| JP | A-S63-180734 | 7/1988 |

(Continued)

OTHER PUBLICATIONS

International Search Report dated Nov. 28, 2017 for PCT/JP2017/039637.
International Search Report/Written Opinion dated Nov. 28, 2017 for PCT/JP2017/039637.
JP Office Action dated Jul. 7, 2020 from corresponding Japanese patent application No. 2016-215331 (with attached English-language translation).
CN Office Action dated Sep. 22, 2020 in Chinese Application No. 201780068040.1 (with attached English-language translation).

*Primary Examiner* — Alexander C Kollias
(74) *Attorney, Agent, or Firm* — Faegre Drinker Biddle & Reath LLP

(57) ABSTRACT

A friction material composition of the present invention includes a fibrous base, a friction regulator, and a binder and has a copper content of 0.5 mass % or less in terms of copper element amount. The friction material composition contains regenerated cellulosic fibers as the fibrous base. In an embodiment of the friction material composition, the regenerated cellulose fiber has a fiber length of 2 mm to 20 mm.

3 Claims, No Drawings

(56) References Cited

FOREIGN PATENT DOCUMENTS

| | | |
|---|---|---|
| JP | A-S63-195437 | 8/1988 |
| JP | A-S63-285344 | 11/1988 |
| JP | A-S64-021231 | 1/1989 |
| JP | A-S64-069832 | 3/1989 |
| JP | A-H01-268725 | 10/1989 |
| JP | A-H01-292088 | 11/1989 |
| JP | A-H02-086681 | 3/1990 |
| JP | A-H03-092628 | 4/1991 |
| JP | A-H03-277836 | 12/1991 |
| JP | A-H06-158029 | 6/1994 |
| JP | A-H07-332414 | 12/1995 |
| JP | A-H08-245809 | 9/1996 |
| JP | A-2004-099902 | 4/2004 |
| JP | A-2004-256560 | 9/2004 |
| JP | A-2005-120163 | 5/2005 |
| JP | A-2008-190092 | 8/2008 |
| JP | 2010-77341 A | 4/2010 |
| JP | 2013-185016 A | 9/2013 |
| JP | 2014-527562 A | 10/2014 |
| JP | 2015-157914 A | 9/2015 |
| JP | T-2016-530366 | 9/2016 |

\* cited by examiner

FRICTION MATERIAL COMPOSITION AND FRICTION MATERIAL

TECHNICAL FIELD

The present invention relates to a friction material composition and a friction material, and more particularly to a friction material composition used in brake pads, brake linings, clutch facings and the like of industrial machines, railroad vehicles, cargo vehicles, passenger cars, and a friction material obtained from the friction material composition.

BACKGROUND ART

Conventionally, a friction material used for brake pads and the like is manufactured by mixing a fiber base material, a friction modifier, and a binder to prepare a friction material composition, and subjecting the composition to steps such as preforming, thermoforming, finishing, and the like.

A fiber base material forming the skeleton of the friction material compensates for strength, heat resistance, abrasion resistance, and the like of the friction material, and examples thereof include organic fibers such as aramid fibers, inorganic fibers such as glass fibers, and metal fibers such as copper fibers.

In a technique examined for blending of organic fibers, for example, Patent Document 1 proposes a friction material composition comprising a fiber base material, a binder, an organic filler, and an inorganic filler, which contains 1 mass % to 10 mass % of a natural cellulose short fiber having an average fiber length of 0.1 μm to 50 μm and an aspect ratio of 1.5 or more as the fiber base material. In a technique examined for blending of metal fibers, for example, Patent Document 2 proposes a brake friction material containing at least a reinforcing fiber, a binder, a lubricant, a friction modifier, and a filler, which contains 5 mass % to 10 mass % of a steel fiber, 5 mass % to 10 mass % of a copper fiber having an average fiber length of 2 mm to 3 mm, 2 mass % to 5 mass % of a zinc powder having a particle size of 5 μm to 75 μm when the total amount of the brake friction material is 100 mass %.

Among the metal fibers, the copper fiber is highly ductile and has high thermal conductivity, and therefore has an effect of enhancing fade resistance. One of the roles is to reinforce the friction material. The copper fiber may be used as a copper powder in the form of a powder in some cases.

However, in the friction material containing a copper component, the copper component is released into air as abrasion powder by braking, so that the influence on the natural environment has been pointed out. Therefore, in an effort to restrict the use of copper or the like to an automobile brake pad, the United States Environmental Protection Agency has required to reduce the copper content of the automotive brake pad to less than 5 mass % by 2021, and less than 0.5 mass % by 2025. The state regulation standard of the substance used for the brake pad is countered in California and Washington, and sales of friction material products containing 5 mass % or more of copper and installation to new cars will be prohibited after 2021, and the regulation will be increased to 0.5 mass % or more after 2025.

In recent years, various friction materials with reduced copper content have been proposed.

For example, Patent Document 3 proposes a friction material composition comprising a binder, an organic filler, an inorganic filler, and a fiber base material, which contains not more than 0.5 mass % of copper as an element, 1 mass % to 3 mass % of an iron-based fiber or an iron-based powder, and 10 mass % to 30 mass % of wollastonite as a fiber base material.

PRIOR ART DOCUMENT

Patent Document

Patent Document 1: JP-A-2013-185016
Patent Document 2: JP-A-2010-77341
Patent Document 3: JP-A-2015-157914

SUMMARY OF INVENTION

Problems to be Solved by Invention

In the technique of Patent Document 3, although a certain effect is expected from the viewpoint of increasing the strength of the friction material in the iron-based fiber or the iron-based powder, but problems are that the iron-based fiber or the iron-based powder has a hardness equal to or higher than that of the counterpart material so that the aggressiveness against the counterpart material is increased, squeal vibration and the wheel dust due to the grinding of the counterpart material occur, and wear resistance decreases. In addition, although it is known that the copper component improves the initial effectiveness of the friction material, the effect cannot be obtained by the iron-based fiber or the iron-based powder disclosed in Patent Document 3.

Accordingly, an object of the present invention is to provide a friction material composition capable of obtaining a friction material having excellent wear resistance and initial effectiveness without worsening the aggressiveness to the counterpart material while having high strength and a friction material in a so-called copper-free friction material having a copper content of 0.5 mass % or less.

Means for Solving Problems

As a result of intensive studies, the present inventors have found that the problem can be solved by the friction material obtained by incorporating a regenerated cellulose fiber in the friction material composition, thereby completing the present invention.

That is, the present invention is achieved by the following (1) to (6).

(1) A friction material composition comprising a fiber base material, a friction modifier, and a binder, wherein a content of copper in the friction material composition is 0.5 mass % or less in terms of copper element, and the friction material composition comprises a regenerated cellulose fiber as the fiber base material.

(2) The friction material composition according to (1), wherein a fiber length of the regenerated cellulose fiber is 2 mm to 20 mm.

(3) The friction material composition according to (1) or (2), wherein a fineness of the regenerated cellulose fiber is 0.3 dtex to 100 dtex.

(4) The friction material composition according to any one of (1) to (3), wherein a content of the regenerated cellulose fiber is 0.5 mass % to 10 mass %.

(5) The friction material composition according to any one of (1) to (4), wherein the regenerated cellulose fiber is at least one fiber selected from a group consisting of a rayon fiber, a lyocell fiber, a cupra fiber, and a polynosic fiber.

(6) A friction material molded by using the friction material composition according to any one of (1) to (5).

Effect of the Invention

The present invention is characterized by using a regenerated cellulose fiber as a fiber base material in a friction material composition. In addition to the own strength of the regenerated cellulose fiber, it is possible to impart high strength and wear resistance to the friction material due to the easiness of entanglement of a regenerated cellulose fiber, easiness of embedding of other powder materials, and the like. On the other hand, since the regenerated cellulose fiber which is an organic material is softer than the counterpart material, the aggressiveness to the counterpart material is prevented from worsening. Further, the regenerated cellulose fiber can impart a certain degree of flexibility to the friction material, so that the initial effectiveness can be improved.

As described above, according to the present invention, it is possible to provide a friction material having excellent wear resistance and initial effectiveness without worsening the aggressiveness to the counterpart material while having high strength.

DESCRIPTION OF EMBODIMENTS

The present invention will be described in detail below.

The term "copper-free" in the present invention means that substantially no copper component is contained in the friction material, and specifically, the content thereof is 0.5 mass % or less based on the total amount of the friction material composition.

Further, in the present specification, "mass" is synonymous with "weight".

<Friction Material Composition>

The friction material composition of the present invention, which contains a fiber base material, a friction modifier, and a binder, contains 0.5 mass % or less of copper in the friction material composition in terms of copper element, and contains a regenerated cellulose fiber as the fiber base material.

The regenerated cellulose fiber is obtained by chemically dissolving natural cellulose contained in wood pulp, cotton or the like using a solvent or the like, extracted, and spun again, and known fibers can be used.

The regenerated cellulose fiber has strength and the regenerated cellulose fiber is easily entangled with each other. Therefore, the friction material molded by using the friction material composition of the present invention can have the same strength as that of the conventional friction material since other powder components in the friction material composition are easily embedded. Further, since flexibility can be imparted to the friction material by using the regenerated cellulose fiber, the contact property with the counterpart material is improved, and the wear resistance and the initial effectiveness can be improved.

The type of the regenerated cellulose fiber used in the present invention is not particularly limited, and examples thereof include a rayon fiber, a lyocell fiber, a cupra fiber, a polynosic fiber, and the like, and one or more thereof can be suitably used. Among them, a rayon fiber having an uneven shape in cross section and is superior in embedding properties of other friction material, and a lyocell fiber having high strength and is easily fibrillated and excellent in entanglement of fibers with each other are preferable from the viewpoint of enhancing strength and wear resistance. Particularly, the lyocell fiber is further preferable due to exhibiting strength and wear resistance equivalent to those in use of the copper fiber.

In the present invention, the fiber length of the regenerated cellulose fiber is preferably 2 mm to 20 mm. When the fiber length of the regenerated cellulose fiber is 2 mm or more, sufficient strength can be imparted to the friction material molded by using the friction material composition, and when the fiber length of the regenerated cellulose fiber is 20 mm or less, the occurrence of segregation of the mixed raw material during the preparation of the friction material can be suppressed, and a friction material of homogeneous quality can be obtained. In particular, from the viewpoint of further improving the effect of the present invention, the fiber length of the regenerated cellulose fiber is preferably 2 mm to 15 mm.

In the present invention, the fineness of the regenerated cellulose fiber is preferably 0.3 dtex to 100 dtex. The regenerated cellulose fiber having a fineness of less than 0.3 dtex is poor in versatility due to difficulty in manufacture. When the fineness of the regenerated cellulose fiber is 100 dtex or less, occurrence of segregation of the mixed raw materials during preparation of the friction material is suppressed, and a friction material of homogeneous quality is obtained. In particular, from the viewpoint of further improving the effect of the present invention, the fineness of the regenerated cellulose fiber is preferably 0.3 dtex to 10 dtex.

The fiber length and fineness of the regenerated cellulose fiber can be adjusted to a desired range by adjusting a concentration of a spinning dope, adjusting a spinning condition, a scouring condition, and the like. Specific examples of spinning methods include a solvent spinning method, a semi-dry wet spinning method, and a melt-blown method.

The method for measuring the fiber length and fineness of the regenerated cellulose fiber according to the present invention conforms to the method of the chemical fiber stapling test of JIS L1015 (2010).

The content of the regenerated cellulose fiber is preferably 0.5 mass % to 10 mass % with respect to the whole friction material composition. When the content of the regenerated cellulose fiber is 0.5% mass % or more, sufficient strength can be imparted to the friction material molded by using the friction material composition. When the content of the regenerated cellulose fiber exceeds 10 mass %, the mixed raw materials may be segregated, so that the occurrence of segregation of the mixed raw materials during preparation of the friction material is suppressed, and a friction material of homogeneous quality can be obtained. In addition, the content of the regenerated cellulose fiber is more preferably 2 mass % to 10 mass %, and particularly preferably 4 mass % to 10 mass %, from the viewpoint of further improving the strength of the friction material, the aggressiveness to the counterpart material, the wear resistance, and the initial effectiveness.

In the friction material composition of the present invention, a fiber base material other than the regenerated cellulose fiber may be used in combination. Examples of such a fiber base material include organic fibers, inorganic fibers, and metal fibers. Examples of organic fibers include an aromatic polyamide (aramid) fiber, a flame resistant acrylic fiber, and a cellulose fiber (excluding regenerated cellulose fiber), examples of inorganic fibers include a biosoluble fiber, a glass fiber, a carbon fiber, and the like, and examples of the metal fibers include a steel fiber, an aluminum fiber, a zinc fiber, a tin or a tin alloy fiber, a stainless steel fiber, a copper or a copper alloy fiber, and the like. Examples of the biosoluble fibers include biosoluble ceramic fibers such as a $SiO_2$—CaO—MgO fiber, a $SiO_2$—CaO—MgO—$Al_2O_3$ fiber, and a $SiO_2$—MgO—SrO fiber, and biosoluble rock wool.

The content of the fiber base material including the regenerated cellulose fiber is preferably about 1 mass % to 25 mass % based on the whole friction material composition.

When the copper or copper alloy fiber is contained in the friction material composition, the content of copper in the friction material composition is 0.5 mass % or less in terms of copper element in view of the environmental regulation. In the present invention, the friction material composition preferably contains substantially no copper.

The friction modifier is used to impart desired friction properties such as wear resistance, heat resistance, fade resistance, and the like to the friction material.

Examples of the friction modifier include inorganic fillers such as barium sulfate, calcium carbonate, calcium hydroxide, vermiculite, mica (phlogopite, muscovite, synthetic mica, natural mica), potassium titanate, lithium potassium titanate, magnesium potassium titanate and the like; abrasives such as alumina, silica, magnesia, zirconia, zirconium silicate, chromium oxide, iron tetroxide ($Fe_3O_4$), and the like; metal powders such as aluminum, zinc, tin, and the like; organic fillers such as various rubber powders (rubber dust, tire powder, etc.), cashew dust, melamine dust, and the like; and solid lubricants such as graphite, molybdenum disulfide, tin sulfide, polytetrafluoroethylene (PTFE), and the like. These friction modifiers may be used alone or two or more thereof may be used in combination.

The content of the friction modifier may be appropriately adjusted according to the desired friction properties, preferably 60 mass % to 90 mass %, and more preferably 65 mass % to 85 mass % based on the whole friction material composition.

The binder is used for integrating the fiber base material and the friction modifier contained in the friction material composition. Examples of the binder include thermosetting resins such as various modified phenol resins such as straight phenol resins and elastomers, and thermosetting resins such as melamine resins, epoxy resins, and polyimide resins, and the like. Examples of the elastomer-modified phenol resin include an acrylic rubber-modified phenol resin, a silicone rubber-modified phenol resin, and an NBR rubber-modified phenol resin, and the like. These binders may be used alone or two or more thereof may be used in combination.

The content of the binder is preferably 5 mass % to 13 mass %, more preferably 7 mass % to 11 mass %, based on the whole friction material composition in order to ensure sufficient mechanical strength and wear resistance.

In addition to the fiber base material, the friction modifier, and the binder, other materials may be blended in the friction material composition of the present invention as necessary.

The friction material composition of the present invention can be used as a friction material for a brake pad, a brake lining, a clutch facing, and the like of industrial machines, railroad vehicles, cargo vehicles, passenger cars, and the like by molding the friction material composition.

<Friction Material>

The friction material of the present invention is formed using the above-described friction material composition.

A method for manufacturing the friction material of the present invention will be described below.

The friction material production method of the present invention is characterized in that the method includes a step of mixing a fiber base material, a friction modifier, and a binder such that the content of copper is 0.5 mass % or less in terms of copper element, and preparing the friction material composition and a step of molding the friction material composition obtained in the above step into a desired shape, and the fiber base material contains a regenerated cellulose fiber. As the friction material composition, the above-described composition raw material and the blending ratio thereof are applied. Hereinafter, each step will be described in detail.

In the step of preparing the friction material composition, first, raw materials of the friction material composition are mixed at a predetermined blending ratio to prepare the friction material composition, and the friction material composition is sufficiently homogenized by dry mixing.

Subsequently, the homogenized friction material composition is preferably temporarily pressed at room temperature to prepare a preform.

Next, in the step of forming the friction material composition into a desired shape, a friction material molded body is obtained by putting the preform into a thermoforming mold, overlapping a metal plate (pressure plate), and performing heat compression molding. The heating compression molding is preferably performed under conditions of a molding temperature of 130° C. to 180° C., a molding pressure of 30 MPa to 80 MPa, and a molding time of 2 minutes to 10 minutes.

It is preferable to perform after-curing (heat treatment) on the friction material molded body. The thermosetting resin can be sufficiently cured to impart the necessary strength to the friction material by performing the after-curing. The after-curing may be performed under conditions of 150° C. to 300° C. and 1 hour to 5 hours.

Thereafter, as necessary, a finishing treatment such as grinding, scorching, painting, and the like may be further performed.

Since the friction material molded by using the friction material composition of the present invention contains the regenerated cellulose fiber, the friction material has excellent strength, wear resistance, as well as a property of suppressing the worsening the aggressiveness to the counterpart material, and has excellent initial effectiveness.

EXAMPLES

Hereinafter, the present invention will be further described with reference to Examples and Comparative Examples, but the present invention is not limited to the following Examples.

Examples 1 to 10 and Comparative Examples 1 to 4

The blending materials shown in Table 1 were collectively fed to a mixing stirrer, and mixed at room temperature for 2 minutes to 10 minutes to obtain the friction material composition. The obtained friction material composition was subjected to the following preforming (i), thermoforming (ii), heating and calcining (iii) to prepare a brake pad including the friction material.

(i) Preforming

The friction material composition was put into a mold of a preforming press, and molding was performed at room temperature for 1 second at 15 MPa to prepare a preform.

(ii) Thermoforming

The preform was put into a thermoforming mold, and a metal plate (pressure plate) coated with an adhesive was overlapped, and therefore subjected to heat compression molding at 150° C. for 5 minutes at 40 MPa.

(iii) Heating and Calcining

The heat compression molded body obtained in step (ii) was subjected to heat treatment at 150° C. to 300° C. for 1 hour to 4 hours, and then grinded. Next, the surface of the heated compression molded body was subjected to a scorching treatment, followed by painting to obtain the brake pad including the friction material.

The friction material shear strength, the wear loss, the aggressiveness to the counterpart material, and the initial effectiveness characteristic were evaluated by the following method for the brake pad including the friction material obtained in Examples 1 to 10 and Comparative Examples 1 to 4.

(1) Friction Material Shear Strength

The friction material shear strength was measured with respect to a test piece (30 mm×10 mm×4.8 mm in thickness) of a friction material in accordance with JIS D4422.

The shear strength (unit: N/cm$^2$) is evaluated, "⊚" is indicated for the case of 700 or more, "○" is indicated for the case of 650 or more and less than 700, "Δ" is indicated for the case of 600 or more but less than 650, and "x" is indicated for less than 600.

(2) Friction Material Wear Test

Using a friction tester (⅓ scale tester manufactured by Akebono Brake Industry Co., Ltd.) according to JASO-C427, the test piece (30 mm×10 mm×4.8 mm in thickness) of the friction material was tested at a brake temperature of 200° C. The wear loss of the friction material corresponding to 1000 times of braking was obtained and the wear resistance was evaluated. The FC 250 was used as the counterpart material (rotor).

Friction material wear loss (unit: mm) was evaluated, "⊚" is indicated for less than 0.35, "○" is indicated for 0.35 or more and less than 0.40, "Δ" is indicated for 0.40 or more and less than 0.45, and "x" is indicated for 0.45 or more.

(3) Aggressiveness to Counterpart Material

The wear loss of the counterpart material after the test of the friction material wear test (2) was measured.

The counterpart material wear loss (unit: μm) was evaluated, "⊚" is indicated for less than 10, "○" is indicated for 10 or more and less than 15, and "x" is indicated for 15 or more.

(4) Initial Effectiveness Property

Using a friction tester (full-size dynamometer) according to JASO-C406 (2000), an initial effectiveness property (average μ) at an initial speed of 20 km/h in a general performance test on a test piece (30 mm×10 mm×4.8 mm in thickness) of a friction material was measured.

The average μ of first effectiveness at 20 km/h was evaluated, "⊚" is indicated for 0.35 or more, "○" is indicated for 0.30 or more and less than 0.35, and "x" is indicated for less than 0.30.

The results of each test are shown in Tables 1(a) to 1(f).

TABLE 1(a)

| | | [Unit: mass %] | Example 1 | Example 2 | Example 3 | Example 4 | Example 5 |
|---|---|---|---|---|---|---|---|
| Blending composition | Binder | Phenol resin | 8.0 | 8.0 | 8.0 | 8.0 | 8.0 |
| | Fiber base material | Aramid fiber | 5.0 | 5.0 | 5.0 | 5.0 | 5.0 |
| | | Biosoluble inorganic fiber | 8.0 | 8.0 | 8.0 | 8.0 | 8.0 |
| | | Rayon fiber (*1) | 0.5 | 2.0 | 4.0 | 6.0 | 10.0 |
| | | Lyocell fiber (*2) | — | — | — | — | — |
| | | Copper fiber | — | — | — | — | — |
| | | Iron fiber | — | — | — | — | — |
| | | Natural cellulose short fiber(*3) | — | — | — | — | — |
| | Friction modifier | Cashew dust | 3.0 | 3.0 | 3.0 | 3.0 | 3.0 |
| | | Rubber dust | 3.0 | 3.0 | 3.0 | 3.0 | 3.0 |
| | | Phlogopite | 3.0 | 3.0 | 3.0 | 3.0 | 3.0 |
| | | Calcium carbonate | 7.0 | 7.0 | 7.0 | 7.0 | 7.0 |
| | | Barium sulfate | 24.5 | 23.0 | 21.0 | 19.0 | 15.0 |
| | | Potassium titanate | 13.0 | 13.0 | 13.0 | 13.0 | 13.0 |
| | Lubricant | Graphite | 10.0 | 10.0 | 10.0 | 10.0 | 10.0 |
| | Abrasives | Iron oxide | 9.0 | 9.0 | 9.0 | 9.0 | 9.0 |
| | | Zirconium silicate | 5.0 | 5.0 | 5.0 | 5.0 | 5.0 |
| | | Alumina | 1.0 | 1.0 | 1.0 | 1.0 | 1.0 |
| | | Total | 100 | 100 | 100 | 100 | 100 |

*1: Rayon fiber, fiber length 8 mm, fineness 2.2 dtex
*2: Lyocell fiber, fiber length 4 mm, fineness 1.7 dtex
*3: Natural cellulose short fiber, fiber length 8 μm, fineness 1.6 dtex TABLE 1(b)

| | | [Unit: mass %] | Example 1 | Example 2 | Example 3 | Example 4 | Example 5 |
|---|---|---|---|---|---|---|---|
| Evaluation | Strength | Shear strength at normal temperature (N/cm$^2$) | 633 | 663 | 785 | 719 | 693 |
| | | Judgement | Δ | ○ | ⊚ | ⊚ | ○ |
| | Wear resistance | Pad wear loss at 200° C. [mm] | 0.42 | 0.38 | 0.31 | 0.33 | 0.36 |
| | | Judgement | Δ | ○ | ⊚ | ⊚ | ○ |
| | aggressiveness to counterpart material | Rotor wear loss at 200° C. [mm] | 7.2 | 6.8 | 6.3 | 6.9 | 6.9 |
| | | Judgement | ⊚ | ⊚ | ⊚ | ⊚ | ⊚ |
| | Initial effectiveness property | First effectiveness μ (20 km/h average 1-3 MPa) | 0.36 | 0.37 | 0.37 | 0.38 | 0.39 |
| | | Judgement | ⊚ | ⊚ | ⊚ | ⊚ | ⊚ |

TABLE 1(c)

| [Unit: mass %] | | | Example 6 | Example 7 | Example 8 | Example 9 | Example 10 |
|---|---|---|---|---|---|---|---|
| Blending composition | Binder | Phenol resin | 8.0 | 8.0 | 8.0 | 8.0 | 8.0 |
| | Fiber base material | Aramid fiber | 5.0 | 5.0 | 5.0 | 5.0 | 5.0 |
| | | Biosoluble inorganic fiber | 8.0 | 8.0 | 8.0 | 8.0 | 8.0 |
| | | Rayon fiber (*1) | — | — | — | — | — |
| | | Lyocell fiber (*2) | 0.5 | 2.0 | 4.0 | 6.0 | 10.0 |
| | | Copper fiber | — | — | — | — | — |
| | | Iron fiber | — | — | — | — | — |
| | | Natural cellulose short fiber(*3) | — | — | — | — | — |
| | Friction modifier | Cashew dust | 3.0 | 3.0 | 3.0 | 3.0 | 3.0 |
| | | Rubber dust | 3.0 | 3.0 | 3.0 | 3.0 | 3.0 |
| | | Phlogopite | 3.0 | 3.0 | 3.0 | 3.0 | 3.0 |
| | | Calcium carbonate | 7.0 | 7.0 | 7.0 | 7.0 | 7.0 |
| | | Barium sulfate | 24.5 | 23.0 | 21.0 | 19.0 | 15.0 |
| | | Potassium titanate | 13.0 | 13.0 | 13.0 | 13.0 | 13.0 |
| | Lubricant | Graphite | 10.0 | 10.0 | 10.0 | 10.0 | 10.0 |
| | Abrasives | Iron oxide | 9.0 | 9.0 | 9.0 | 9.0 | 9.0 |
| | | Zirconium silicate | 5.0 | 5.0 | 5.0 | 5.0 | 5.0 |
| | | Alumina | 1.0 | 1.0 | 1.0 | 1.0 | 1.0 |
| | | Total | 100 | 100 | 100 | 100 | 100 |

*1: Rayon fiber, fiber length 8 mm, fineness 2.2 dtex
*2: Lyocell fiber, fiber length 4 mm, fineness 1.7 dtex
*3: Natural cellulose short fiber, fiber length 8 μm, fineness 1.6 dtex

TABLE 1(d)

| [Unit: mass %] | | | Example 6 | Example 7 | Example 8 | Example 9 | Example 10 |
|---|---|---|---|---|---|---|---|
| Evaluation | Strength | Shear strength at normal temperature (N/cm$^2$) | 702 | 744 | 878 | 863 | 766 |
| | | Judgement | ◎ | ◎ | ◎ | ◎ | ◎ |
| | Wear resistance | Pad wear loss at 200° C. [mm] | 0.39 | 0.32 | 0.27 | 0.27 | 0.31 |
| | | Judgement | ○ | ◎ | ◎ | ◎ | ◎ |
| | aggressiveness to counterpart material | Rotor wear loss at 200° C. [mm] | 7.3 | 6.7 | 7.0 | 6.8 | 6.7 |
| | | Judgement | ◎ | ◎ | ◎ | ◎ | ◎ |
| | Initial effectiveness property | First effectiveness μ (20 km/h average 1-3 MPa) | 0.37 | 0.38 | 0.38 | 0.38 | 0.39 |
| | | Judgement | ◎ | ◎ | ◎ | ◎ | ◎ |

TABLE 1(e)

| [Unit: mass %] | | | Comparative Example 1 | Comparative Example 2 | Comparative Example 3 | Comparative Example 4 |
|---|---|---|---|---|---|---|
| Blending composition | Binder | Phenol resin | 8.0 | 8.0 | 8.0 | 8.0 |
| | Fiber base material | Aramid fiber | 5.0 | 5.0 | 5.0 | 5.0 |
| | | Biosoluble inorganic fiber | 8.0 | 8.0 | 8.0 | 8.0 |
| | | Rayon fiber (*1) | — | — | — | — |
| | | Lyocell fiber (*2) | — | — | — | — |
| | | Copper fiber | — | 4.0 | — | — |
| | | Iron fiber | — | — | 4.0 | — |
| | | Natural cellulose short fiber(*3) | — | — | — | 4.0 |
| | Friction modifier | Cashew dust | 3.0 | 3.0 | 3.0 | 3.0 |
| | | Rubber dust | 3.0 | 3.0 | 3.0 | 3.0 |
| | | Phlogopite | 3.0 | 3.0 | 3.0 | 3.0 |
| | | Calcium carbonate | 7.0 | 7.0 | 7.0 | 7.0 |
| | | Barium sulfate | 25.0 | 21.0 | 21.0 | 21.0 |
| | | Potassium titanate | 13.0 | 13.0 | 13.0 | 13.0 |
| | Lubricant | Graphite | 10.0 | 10.0 | 10.0 | 10.0 |
| | Abrasives | Iron oxide | 9.0 | 9.0 | 9.0 | 9.0 |
| | | Zirconium silicate | 5.0 | 5.0 | 5.0 | 5.0 |
| | | Alumina | 1.0 | 1.0 | 1.0 | 1.0 |
| | | Total | 100 | 100 | 100 | 100.0 |

*1: Rayon fiber, fiber length 8 mm, fineness 2.2 dtex
*2: Lyocell fiber, fiber length 4 mm, fineness 1.7 dtex
*3: Natural cellulose short fiber, fiber length 8 μm, fineness 1.6 dtex TABLE 1(f)

| [Unit: mass %] | | | Comparative Example 1 | Comparative Example 2 | Comparative Example 3 | Comparative Example 4 |
|---|---|---|---|---|---|---|
| Evaluation | Strength | Shear strength at normal temperature (N/cm$^2$) | 597 | 867 | 860 | 602 |
| | | Judgement | X | ◎ | ◎ | Δ |
| | Wear resistance | Pad wear loss at 200° C. [mm] | 0.45 | 0.28 | 0.58 | 0.46 |
| | | Judgement | X | ◎ | X | X |
| | aggressiveness to counterpart material | Rotor wear loss at 200° C. [mm] | 7.4 | 7.1 | 16.7 | 7.2 |
| | | Judgement | ◎ | ◎ | X | ◎ |
| | Initial effectiveness property | First effectiveness μ (20 km/h average 1-3 MPa) | 0.33 | 0.38 | 0.34 | 0.35 |
| | | Judgement | ○ | ◎ | ○ | ◎ |

From the results of Tables 1(a) to 1(f), the friction materials of Examples 1 to 10 containing regenerated cellulose fibers as the fiber base materials were excellent in strength and wear resistance as compared with Comparative Example 1 which does not contain the regenerated cellulose fibers and Comparative Example 4 in which a natural cellulose short fiber was blended. It was also found that by blending 2 mass % or more of the regenerated cellulose fiber, strength and wear resistance are further improved.

Comparing Examples 1 to 5 with Examples 6 to 10, when the content of the rayon fiber and the lyocell fiber is the same, the friction material composition containing the lyocell fiber exhibited better strength and wear resistance. In particular, the friction material of Example 8 in which 4 mass % of the lyocell fiber was blended showed the same strength and wear resistance as the friction material of Comparative Example 2 in which 4 mass % of the copper fiber was blended.

In addition, in the friction material of Comparative Example 3 in which the iron fiber was blended, the wear resistance and the aggressiveness to the counterpart material were poor, but all of the friction materials of Examples 1 to 10 were satisfactory in the aggressiveness to the counterpart material.

Regarding the initial effectiveness property, the friction materials of Examples 1 to 10 in which the regenerated cellulose fiber was blended showed good results.

Although the invention has been described in detail with reference to specific embodiments, it will be apparent to those skilled in the art that various changes and modifications can be made without departing from the spirit and scope of the invention. This application is based on Japanese Patent Application number 2016-215331 filed Nov. 2, 2016, the contents of which are incorporated herein by way of reference.

INDUSTRIAL APPLICABILITY

Since the friction material of the present invention has high strength and excellent wear resistance and initial effectiveness without worsening aggressiveness to a counterpart member, the friction material is suitably used for brake pads, brake linings, clutch facings, and the like of industrial machines, railroad vehicles, cargo vehicles, passenger cars, and the like.

The invention claimed is:

1. A friction material composition comprising a fiber base material, a friction modifier, and a binder, wherein
    a content of copper in the friction material composition is 0.5 mass % or less in terms of copper element,
    the friction material composition comprises a regenerated cellulose fiber as the fiber base material,
    the binder is a phenol resin,
    a content of the binder is 8 mass %,
    the friction modifier comprises (i) a combination of cashew dust, rubber dust, phlogopite, calcium carbonate, barium sulfate, and potassium titanate, (ii) graphite as a solid lubricant, and (iii) a combination of iron oxide, zirconium silicate, and alumina as abrasives,
    a content of the friction modifier is 69 mass % to 78.5 mass %,
    in the friction modifier, a content of the cashew dust is 3 mass %, a content of the rubber dust is 3 mass %, a content of the phlogopite is 3 mass %, a content of the calcium carbonate is 7 mass %, a content of the barium sulfate is 15 mass % to 24.5 mass %, a content of the potassium titanate is 13 mass %, a content of the graphite is 10 mass %, a content of the iron oxide is 9 mass %, a content of the zirconium silicate is 5 mass %, and a content of the alumina is 1 mass %,
    the regenerated cellulose fiber is a rayon fiber or a lyocell fiber,
    the regenerated cellulose fiber has a fiber length of 4 mm to 8 mm, and
    a content of the regenerated cellulose fiber is 0.5 mass % to 10 mass %.

2. The friction material composition according to claim 1, wherein the regenerated cellulose fiber has a fineness of 0.3 dtex to 100 dtex.

3. A friction material molded by using the friction material composition according to claim 1.

* * * * *

UNITED STATES PATENT AND TRADEMARK OFFICE
CERTIFICATE OF CORRECTION

PATENT NO. : 11,209,063 B2
APPLICATION NO. : 16/346628
DATED : December 28, 2021
INVENTOR(S) : Toru Kawata, Takuya Takada and Motoyuki Miyaji It is certified that error appears in the above-identified patent and that said Letters Patent is hereby corrected as shown below:

On the Title Page

Item (22) "PCT Filed"
"Jan. 11, 2017" should be changed to --Nov. 1, 2017--

Signed and Sealed this
Twenty-sixth Day of April, 2022

Katherine Kelly Vidal
*Director of the United States Patent and Trademark Office*